United States Patent [19]

McDougal

[11] Patent Number: 4,524,043

[45] Date of Patent: Jun. 18, 1985

[54] PROCESS FOR THE MANUFACTURE OF PRODUCTS FROM REINFORCED POLYESTER RESINS

[76] Inventor: John R. McDougal, 7043 Strout Rd., Morrow, Ohio 45152

[21] Appl. No.: 587,319

[22] Filed: Feb. 21, 1984

Related U.S. Application Data

[63] Continuation-in-part of Ser. No. 441,385, Nov. 12, 1982, abandoned, and Ser. No. 510,596, Jul. 5, 1983.

[51] Int. Cl.$^3$ ................................................ B29G 1/00
[52] U.S. Cl. ................................. 264/320; 264/137; 264/236; 264/331.18; 264/DIG. 42; 264/DIG. 53; 428/402.21; 523/211; 525/936
[58] Field of Search ............... 525/936, 939; 523/211; 428/402.2, 402.21; 264/137, 236, 320, 331.18, 347, DIG. 42, DIG. 53

[56] References Cited

U.S. PATENT DOCUMENTS

| | | | |
|---|---|---|---|
| 3,317,433 | 5/1967 | Eichel | 252/316 |
| 3,395,105 | 7/1968 | Washburn | 260/6 |
| 3,396,117 | 8/1968 | Schuetze | 252/182 |
| 3,505,428 | 4/1970 | Kidwell | 260/831 |
| 3,860,565 | 1/1975 | Barber, Jr. | 260/77.5 |
| 4,080,238 | 3/1978 | Wolinski et al. | 156/305 |
| 4,101,501 | 7/1978 | Hinterwaldner | 260/40 |
| 4,138,462 | 2/1979 | Procida et al. | 264/347 |
| 4,154,774 | 5/1979 | Hinterwaldner | 260/862 |
| 4,237,252 | 12/1980 | Newell et al. | 525/454 |
| 4,252,708 | 2/1981 | Newell | 260/31.8 |
| 4,303,729 | 12/1981 | Torobin | 428/327 |
| 4,303,736 | 12/1981 | Torobin | 428/403 |
| 4,362,566 | 12/1982 | Hinterwaldner | 106/85 |

FOREIGN PATENT DOCUMENTS 57-12017   6/1982   Japan.

*Primary Examiner*—James Lowe
*Attorney, Agent, or Firm*—Pearne, Gordon, Sessions, McCoy, Granger & Tilberry

[57] ABSTRACT

A process for the manufacture of glass fiber-reinforced polyester products is disclosed. A ready-to-mold resin and reinforcement composite is prepared using an initiator which has been microencapsulated in order to prevent initiator-induced cross-linking of the resin reactants. The initiator is released during the molding of the composite by rupture of the microcapsules due to internal vapor pressure developed at a preselected molding temperature. The encapsulation of the initiator provides improved homogeneity and increased flowability of the composites during molding, and enables the provision of molded polyester products having higher degrees of cure and more defect-free finish surfaces.

11 Claims, 2 Drawing Figures

PROCESS FOR THE MANUFACTURE OF PRODUCTS FROM REINFORCED POLYESTER RESINS

This application is a continuation-in-part of application Ser. No. 441,385, filed Nov. 12, 1982, now abandoned, and of Ser. No. 510,596, filed July 5, 1983.

BACKGROUND OF THE INVENTION

This invention relates to a process for the manufacture of products from reinforced polyester resins and, more particularly, polyester resin systems which are reinforced with glass fibers. In accordance with the process, encapsulated reaction additives such as initiators remain functionally isolated in the blended molding materials until released by preselected process conditions. Products manufactured from reinforced polyester resins are widely used in automotive, appliance, and other industries.

In the processes now employed, polyester resin reactants are added to a large mixer along with the additives, such as promoters or accelerators, inhibitors, pigments, stearates, fillers, thermoplastic profiling compounds, and the initiator or catalyst. The material is intensively mixed with high energy shearing for perhaps 20 minutes and then it is made into sheet molding compound (SMC), thick molding compound (TMC) or bulk molding compound (BMC).

With SMC, the reinforcing glass fibers are of variable length and are introduced as the mixture of resin and additives is disposed between sheets of protective polyethylene film. Optionally, continuous lengths of glass fiber roving or mat may be disposed between sheets of compound, which in turn are covered, top and bottom, with protective polyethylene film. The film-protected SMC composite is passed between rollers which knead the composite in order to thoroughly mix and wet the glass fiber with resin reactants. The SMC is up to perhaps ¼ inch thick. There are special high strength forms of SMC based upon particular fiberglass reinforcement characteristics. The TMC comes in sheet form like SMC, but may be up to several inches thick.

With BMC, short glass fibers ⅛ to 1-¼ inches long are the reinforcement and are added at the time of mixing. BMC has a consistency similar to that of modeling clay and is extruded into logs or ropes, or pelletized, or may be used right out of the mixer.

The ready-to-mold resin and reinforcement composites in the form of SMC and BMC materials are made up intermittently in large batches in accordance with production demand. After mixing, they are stored under controlled conditions until they are used. Because the initiator is mixed into the compound, the compounds are partially cured and gelled, which increases their viscosity, and they continue to cure slowly in storage. After one or two months in storage, they become too cured or viscous to use and must be discarded. They thus have limited shelf life, depending upon storage conditions.

In the course of the mixing, the temperature increases because of the energy put into the compound and because the reaction is exothermic. The intensity and length of the mixing process must be restricted to avoid excessive premature cure of the compound. Water jacket cooling techniques may be employed, but the mixing operation remains an art with variation of resin materials and initiators, as well as the possible use of promoters or accelerators and inhibitors. Often, the mixing process is simply terminated just prior to a critical temperature (e.g., 32° C.).

One problem with SMC and BMC materials is that because of the restricted conditions under which they are mixed, it often happens that the initiator and fillers are not completely distributed throughout the mixture. This frequently occurs if the temperature of the mixture increases too much and the mixing operation has to be cut short before the additives are completely mixed in.

SMC is, for the most part, molded in matched metal die compression molds. It usually is about 24 inches wide and is weighed and cut into suitable lengths for insertion into the molds. BMC is likewise molded in compression molds. Pieces of BMC are cut off by weight and placed into molds. Charges can weigh as much as 30 pounds or more. BMC can be preheated in a screw and injected into the mold. It can also be injection-molded with a plunger. SMC, TMC, and BMC materials can also be molded in transfer molds. At this writing, most production uses either SMC or BMC compounds. The use of TMC is limited.

It is desirable for cost purposes to minimize the molding cycle or time, which tends to increase with the weight of the charge to the mold. To that end, increased amounts of initiators are used in combination with inhibitors, which act as free radical traps and tend to prevent premature initiation of polymerization. Preferably, the effect of the initiator is depressed during the storage of the compounds to improve shelf life, as well as during the mold filling process. However, at the desired point of cure, the initiators should cause rapid cure at high temperatures. Heretofore, these ideal conditions have been sought through the use of combinations of initiators and inhibitors, as well as promoters or accelerators, which tend to lower the decomposition temperature of the initiator. Combinations of these reaction additives involve trade-offs in the physical properties of the cured resin. Further reference is made to U.S. Pat. No. 2,632,751, columns 1 and 2.

For the products molded from SMC and BMC materials, there have always been problems in filling the molds completely and in obtaining suitable surface finish of the molded parts, even though inhibitors are used to delay the curing reaction and viscosity increases. From 10–20% of the products so molded have to be hand-finished, which is expensive and time-consuming. Even with hand-finishing, the scrap rate for these molded products may be in the order of 50%. The molded products are usually painted, but they have to be washed and cleaned before they can be painted. In both the cleaning and painting steps, the products are heated back up to temperatures which approach those at which they were molded. Most products are between 85% and 90% cured when they come out of thee compression mold. The heating from the washing and painting increases the degree of cure, but also relieves stresses in the parts, causing warpage and distortion.

Curable resin compositions containing encapsulated catalysts are known. U.S. Pat. No. 3,860,565 teaches the encapsulation of the catalysts for isocyanate resins and identifies a number of other patents relating to curable resin systems with encapsulated catalysts. So far as I know, however, no one has ever taught or suggested the encapsulation of the initiators or catalysts in polyester resin systems. These initiators are usually organic peroxides in the form of volatile liquids. Such initiators are toxic and difficult to handle.

The processes for the micro-encapsulation of materials are well known, and have been well known ever since the end of World War II. Reference is made to "Microcapsule Processing and Technology," Asaji Kondo, edited and revised by J. Wade Van Valkenburg, Marcel Decker, Inc., New York N.Y. (1979), and "Capsule Technology and Microencapsulation," Noyes Data Corp., Park Ridge, N.J. (1972).

SUMMARY OF THE INVENTION

I have discovered that initiators for polyester resin systems can be encapsulated in rigid microcapsules so as to permit them to be thoroughly mixed into the SMC or BMC materials in the mixing process without breaking, and then be released when the materials are molded. The microcapsules are substantially inert to the components of the ready-to-mold resin composites and serve to isolate the encapsulated additive from reaction with the components. The capsule shell walls are strong enough to retain their integrity throughout the mixing process, but rupture and release the initiator at predetermined molding temperatures and pressures. The internal vapor pressure of the encapsulated material at the molding temperatures is believed to rupture the capsules, releasing the initiator.

The use of thermosetting resin such as phenolic resin to encapsulate organic peroxide initiator has been found to provide satisfactory reaction isolation and structural integrity in polyester systems. The physical characteristics of the microcapsule are matched with the characteristics of the particular organic peroxide initiator and polyester resin system to provide capsule rupture and release of the initiator at a temperature close to the molding temperature of the system.

SMC and BMC materials with my encapsulated initiator have greatly extended shelf life. Viscosity stability has been maintained for over two months in typical composite formulations. The resins have improved molding properties. Hand-finishing and the scrap rate are reduced.

DESCRIPTION OF THE PREFERRED EMBODIMENT

Figure 1:
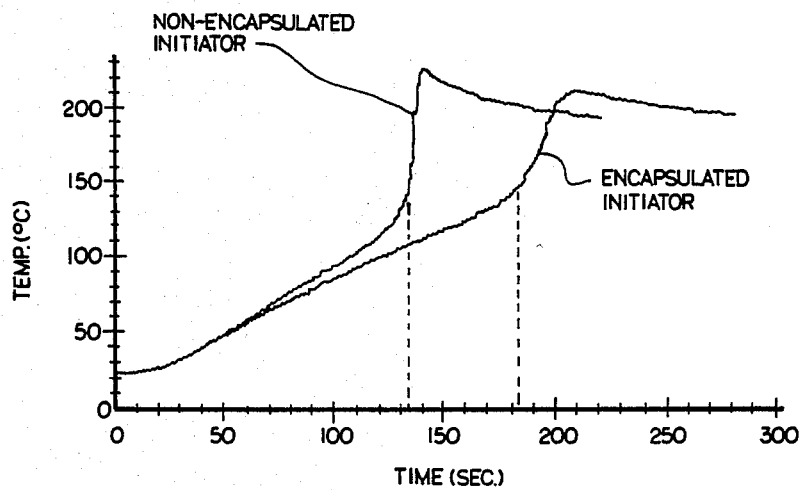
FIG. 1 is a graph displaying the temperature-versus-time profiles for the molding of an SMC composite, with and without initiator encapsulation, in accordance with my invention.

The present invention relates to any of the conventional polyester resin systems which are used to make SMC and BMC materials. These are unsaturated polyester resins, typically the condensation product of a mixture of an unsaturated dibasic acid and a saturated dibasic acid and a glycol. The proportions of saturated and unsaturated dibasic acids are varied depending upon the desired properties of the molded compound, such as flexibility, hardness, heat resistance, and the like. The usual cross-linking monomers are styrene or vinyl toluene. The usual initiators or catalysts are free radical initiators such as organic peroxides which decompose with heat to provide free radicals. Although they are often called catalysts, they are, strictly speaking, initiators because they are used up in the reaction.

Various kinds of fillers are added, such as calcium carbonate, clays, talcs, and the like. Other additives are ultraviolet absorbers, flame retardants, antioxidants, mold release agents, and the like, all as are well known in the art.

Additional description of polyester resin systems appears in U.S. Pat. No. 4,053,448, columns 2-4.

In accordance with my invention, the initiator is encapsulated in microcapsules. The microcapsules of this invention may range in size from 5 to 200 microns. Satisfactory results have been achieved herein with microcapsules ranging from 10 to 50 microns in diameter or size. The encapsulating materials are preferably phenol-formaldehyde resins with physical characteristics, particularly wall thickness and rupture strength, designed to withstand the internal vapor pressure of the encapsulated material up to the pressures developed at the molding temperatures of the SMC or BMC materials. At the molding temperatures, the capsules rupture and release the initiator. At the same time, the capsules are small enough and strong enough so that they can withstand the intensive mixing which is required to form SMC or BMC materials and not release the initiator.

The encapsulating resin and the wall thickness of the capsules are selected to provide rupture at the desired temperature and pressure. As should be obvious, the rupture strength of the resin varies with the resin material and composition. Likewise, thin capsule walls rupture more easily than thick capsule walls. In accordance with my invention, these factors are correlated with vapor pressure to provide rupture at the desired temperature. Molding temperatures are typically in the order of 138° to 177° C., depending upon the initiator. Satisfactory rupture temperatures range from about 30° C. and, more preferaby, from about 10° C. below the molding temperature to about the molding temperature or from about 20% and, more preferably, from about 10% below the molding temperature to about the molding temperature.

The internal vapor pressure for rupturing the microcapsules is developed upon heating of the encapsulated material which preferably includes a liquid phase. The liquid phase may comprise the initiator, a solvent for the initiator, or a diluent for the initiator, or such other liquid phase as may be present within the microcapsule in a form compatible with the initiator.

Following rupture and release of the initiator, the fractured sections or residue of the ruptured capsule wall remain in the composite and molded thermoset product. These fractured sections, which are believed to be fragments of spheres, have not been found to interfere with the provision of commercially acceptable appearance surface part of a Class A surface molded part. Similarly, the potential occurrence of microcapsule (or agglomerated microcapsules) rupture at the surface has not been found to give rise to visual or physical surface defects. Contrarily, my encapsulation techniques have resulted in improved and more defect-free finish surfaces on the molded part as indicated above and demonstrated hereinafter.

Inhibitors are not generally required for the practice of my invention. Encapsulation of the initiator tends to increase the effective decomposition temperature of the particular initiator in a manner different from that encountered in the use of inhibitors, which react with the first free radicals produced. The encapsulation technique of my invention permits one to increase the molding temperature by at least 15%, and thereby allow the mold cycle time to be reduced. Higher temperatures are believed to contribute to the increased degree of cure observed in the use of encapsulated initiators.

There are many advantages which result from the use of my invention. Because the initiator does not interact with the resin until it is released from its capsule, there is very little pre-curing of the resin component in the composite. The composites can be mixed for longer times, at higher temperatures of up to 65° C. or more, so that there is a more homogeneous mixture. When molded, the flow into the mold is excellent, so that the composites completely fill the mold and are otherwise readily molded. The composites have a shelf life limited by the shelf life of the resins. The need for free radical curing inhibitors is eliminated. The initiator, fillers, and other additives are more evenly distributed throughout the composite because one can mix for longer times and at higher temperatures. The improved distribution of the encapsulated initiator is most surprising, since prior art techniques often required dissolving the initiator in a solvent prior to its addition to the composite. Upon curing the composites to provide polyester resin thermoset products, there is increased cross-linking, thus improving dimensional stability and reducing warpage in subsequent washing and painting steps.

Another advantage of my invention is that I do not require promoters or accelerators in order to achieve suitable cure or cross-linking. With my invention, without any promoter, I can achieve cures of at least 85% and preferably up to 95% as measured on a Perkin-Elmer differential scanning calorimeter. Moreover, for all except unusually large parts, the molding time is usually less than 3 minutes, and for many parts is less than 1 minute.

Additional advantages may be obtained by the use of combinations of separately encapsulated, different initiators, as well as mixing different initiators in the same capsules. Also, less than all of the initiator may be encapsulated so as to allow precise control of the amount of initiator available for initial gel and viscosity buildup in SCM applications, for example. Further, a nonencapsulated initiator having a relatively low half-life temperature may be used to effect gel and viscosity buildup and combined with an encapsulated initiator having a high half-life temperature to effect high temperature, more complete cure of the molded product.

The organic peroxides which may be encapsulated in accordance with my invention include any of the well-known diacyl peroxides, peroxyesters, dialkyl peroxides, and peroxyketals. A suitable diacyl peroxide is Benzoyl Peroxide. Suitable peroxyesters are t-Butyl Peroctoate and t-Butyl Perbenzoate. A suitable dialkyl peroxide is di-t-Butyl Peroxide. Suitable peroxyketals are 1,1,bis(t-Butyl Peroxy) Cyclohexane and 1,1,di-t-Butylperoxy 3,3,5 Trimethyl Cyclohexane. All of the above-listed organic peroxides are liquids except for benzoyl peroxide, which must be put into solution in a suitable solvent such as styrene before being encapsulated. The organic peroxide initiators are free radical initiators.

The preferred materials for encapsulating the initiator are phenol-formaldehyde resins. These resins have been found to be particularly suitable for encapsulation of t-Butyl Perbenzoate, 1,1,bis(t-Butyl Peroxy) Cyclohexane and 1,1,di-t-Butylperoxy 3,3,5 Trimethyl Cyclohexane. Other unsaturated thermoset resins may be used, such as polyester resins, urea-formaldehyde, and melamines. The encapsulating material should be inert, relatively brittle, and impervious to the initiator so as to keep it separate from the polyester resin until it is released.

Although glass fibers are the usual reinforcing materials, I contemplate that my invention can be used with other reinforcing materials such as cotton, metal filaments, synthetic fibers, carbon and boron fibers, and the like.

EXAMPLE 1

Comparative tests were made between an SMC composite including an encapulated initiator in accordance with my invention and an otherwise identical composite incorporating the same initiator in a conventional manner without encapsulation. The SMC composites were used to mold a current model automobile grille opening panel. The panel comprises the forward body component in which the grille and headlights are mounted, and it was selected because it is a difficult part to mold and it includes a substantial expanse of finished surface.

The resin system employed in the composite was an Owens-Corning Fiberglas automotive grade polyester resin identified as OCF CX 1248, which is a dicyclopentadiene maleate polyester in styrene monomer with a vinyl acetate acrylic additive as low profile agent. The initiator was t-Butyl Perbenzoate (TBPB). A promoter designated Pep 308 sold by Air Products and Chemicals of Allentown, Pa. was used in the resin system.

The nonencapsulated initiator was added to the resin system of the control composite in a conventional manner. Accordingly, the initator was added directly to the mixer containing the polyester resin system and mixed to a temperature of approximately 32° C.

The initiator was encapsulated in a phenolformaldehyde resin and was manufactured by Capsulate Systems of Fairborn, Ohio, where it is identified as PLAS-TICAP T. The same amount of encapsulated initiator was used as in the control composite with allowance for the weight of the encapsulating material. The encapsulated initiator was added to the resin system of the test composite prepared in accordance with my invention by direct addition to the mix as the resin forming components were blended. In this instance, mixing was allowed to continue until a temperature of approximately 57° C. was reached, since encapsulation of the initiator allows higher mixing temperatures to be used without cross-linking occurring.

The SMC composites were matured for three days to allow for suitable viscosity buildup in accordance with conventional molding procedures. Thereafter, approximately 15 grille opening panels were molded in a compression mold at 160° C. using each of the SMC composites.

The parts molded using the nonencapsulated initiator were badly pre-gelled, and there was excessive porosity. The parts were washed and painted. Upon inspection, the parts were commercially useless, due to their unacceptable appearance and extensive rework would have been required to make them usable.

subsequently, in the same mold at the same temperature, the SMC composite prepared using the encapsulated initiator was used to prepare the test grille panels. On inspection of the molded parts, the pre-gel and porosity were found to have been greatly reduced. The parts were washed and painted, and at least 90% of the parts were commercially acceptable without rework.

The improved flow and moldability of my invention thus provides a much lower scrap rate and reduced amount of hand-finishing. The surface finish is of excellent quality, substantially free of pre-gel imperfections, and ripple is reduced.

EXAMPLE 2

In further comparative tests using SMC composites with and without my encapsulation techniques, automotive spoilers were prepared using matched metal die compression molding. Once again, an automotive grade polyester resin system was used, it being identified as TP 40139, P340/LP40A system. This is a propylene maleate polyester in styrene monomer with a low profile additive. The initiator was TBPB. The SMC composites were prepared and matured in the same manner as in Example 1. For purposes of comparison, 80 spoilers were molded at a mold temperature of 160° C., using each of the SMC composites.

The appearance surfaces of the molded parts were inspected to determine porosity defects. A porosity defect is a pinhole-sized physical opening in the part requiring rework to make the part commercially acceptable. The parts prepared in a conventional manner without encapsulation of the initiator averaged 15.4 porosity defects per part. The parts prepared with the identical SMC composite but for the encapsulted initiator averaged 1.4 porosity defects per part. Obviously, the amount of patching rework was substantially reduced, and production economies were achieved.

The improvements obtained using may encapsulated initiator are believed to be related to the improved homogeneity and increased flowability or flow time of the composites during molding. The latter property is demonstrated by use of a spiral flow test which determines the flow properties of the composite based on the distance it will flow along a spiral runner of constant cross section under controlled conditions of sample weight, pressure, and temperture. The test is usually performed with a transfer molding press and a test mold into which the composite material is fed at the center of the spiral cavity. (See "Whittington's Dictionary of Plastics," Lloyd R. Whittington, Technomic Publishing Co., Inc., Stamford, Conn., 1968.)

The composites of Example 2 were tested using the spiral flow method. The composite having an encapsulated initiator had a spiral flow value equal to 20.5 inches, and the conventional composite including a nonencapsulated initiator had a value of 9.8 inches. The differences in the test values are believed to result from the delay of the cross-linking reaction by encapsulation of the initiator. The initiator remains isolated and initiator-induced cross-linking does not occur until the capsule ruptures and the initiator is released. In contrast therewith, the nonencapsulated initiator induces preliminary cross-linking sufficient to impede the flowability of the composite.

The temperature-versus-time profile for the molding of the SMC composites of Example 1 were determined, using techniques similar to those described in "Curing of Compression Molded Sheet Molding Compound," Ly James Lee, published in *Polymer and Engineering Science*, Mid-June, 1981, Vol. 21, No. 8. Accordingly, identical multiple-layer test samples of the SMC composites were prepared. Each of the samples had a circular configuration and a total thickness of about 1.65 cm. Thermocouple wires were disposed at evenly spaced locations through one-half the thickness of each sample, one thermocouple wire being located at a surface of the sample, one at the thickness midpoint, and two further thermocouple wires being evenly spaced therebetween. Each of the samples was molded at 157° C. and the temperatures of the various thermocouple probes were monitored. The temperature-versus-time profile for the mid-thickness thermocouple wire for each of the composites is shown in FIG. 1.

The profiles of FIG. 1 includes initial portions or zones during which the temperature increases are mainly due to the heat input from the mold. Thereafter, a rapid temperature increase occurs over a second portion or zone of each of the curves during which the temperature increase is caused by the exothermic heat generated during the fast free radical polymerization. It is estimated that about 90% of the total cross-linking occurs during this exothermic portion or zone of the profile. In a final negatively sloping portion of the profile cruve, heat transfer from the hot composite to the mold occurs.

The encapsulation of the initiator has been found to delay the beginning of the exothermic portion of the molding cycle. Herein, the beginning of the exothermic portion of the cycle was delayed from about 135 seconds of about 185 seconds as measured from the beginning of the mold cycle. This extends the portion of the mold cycle, during which the composite has good flowability properties, which in turn enables improved filling of the mold cavity and improved product surface quality.

The delay of substantially all initiator-induced cross-linking prior to capsule rupture permits a more optimized molding cycle, since the composite tends to display a high level of flowability throughout substantially the entire time period preceding the onset of the exothermic portion of the cycle. In this manner, early cross-linking in accordance with the temperature-promoted disassociation of organic peroxide initiators does not occur, due to encapsulation of the initiator. Thus, the portion of the molding cycle time allotted to the filling of the mold cavity may be more efficiently and reliably utilized by the molder. Accordingly, the molding temperature can be increased in order to shorten the molding cycle.

The delay of the exothermic portion of the molding cycle by my encapsulation technique also enables the molding of rapid cross-linking resin and initiator systems which heretofore could not be molded with acceptable commercial production consistency and quality.

Figure 2:
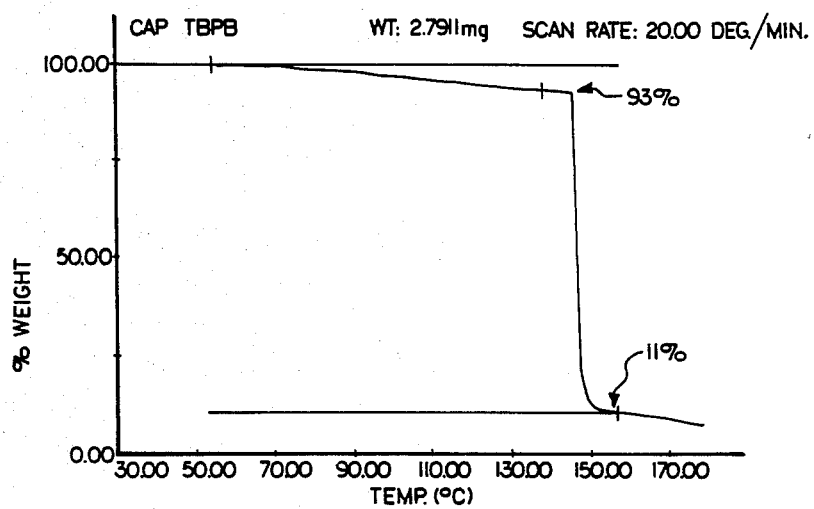
FIG. 2 is a thermogram for an encapsulated initiator.

In illustration of the precision of initiator release in accordance with temperature, the encapsulated initiator used in the foregoing Example was subjected to thermogravimetric analysis (TGA), and the TGA results are presented in the graph of FIG. 2.

In this analysis, a test sample of encapsulated initiator is heated and the sample weight change is recorded as the temperature increases. Herein, the vaporization of the liquid initiator ruptures the microcapsule and the primary weight change is a result of the loss of the vaporized initiator from the test sample.

As shown in FIG. 2, a relatively small change in weight is initially experienced as the test sample loses any residual moisture and, perhaps, a limited number of structurally imperfect capsules rupture and allow vaporization of the initiator. The total weight change is about 7% as the sample is heated to temperatures in excess of 140° C.

At a temperature of about 146° C., significant, if not all, microcapsule rupture begins and substantially all of the rupture is completed as the temperature approaches 150° C., with a small amount of rupture and/or vaporization of residual liquid initiator being completed at a temperature of up to 157° C. The percent weight change between 146° C. and 157° C. is about 82%. This is in close agreement with the approximate 85% by weight core material fill of liquid initiator which was sought in the encapsulation process. The 11% weight remainder is the phenolic material of the capsule wall.

As shown in FIG. 2, the microcapsule structure is sufficiently uniform to permit substantially all of the initiator to be released within a narrow predetermined temperature range with the use of the internal vapor pressure to rupture the microcapsules. As noted above, the rupture temperature may be varied in accordance with the properties of the encapsulation wall material and initiator.

As used herein, the phrase "ready-to-mold resin and reinforcement composite" or abbreviated forms thereof comprehend SMC, TMC, BMC, and other similar pre-mixed, fiber-reinforced molding compounds made with intensive mixing from polyester resin systems which require a free radical initiator. Such molding compounds have an initial viscosity, that is, the viscosity after mixing but before aging, of 40,000 to 80,000 centipoises at 22° C. (Measured with a Brookfeild "HBT Model" viscometer, at 5 rpm's using a number 6 spindle.) After aging, the viscosity should be at least 60,000,000 centipoises and up to 80,000,000 centipoises at 22° C. (measured at 1 rpm, using a TF spindle). These viscosity characteristics are for SMC resin control samples free of fiber reinforcement and thickeners. Corresponding viscosity control measurements are not typically made for BMC or TMC resin materials, but it is believed that similar viscosity values exist. Thus, after aging, the control viscosity for the compond should be at least 60,000,000 centipoises.

The terms "mold" and "molding" comprehend matched metal die compression molds, transfer molds, and injection molds and the process of molding ready-to-mold resin and reinforcement composites in such molds into reinforced polyester resin thermoset articles. The molding pressures involve range from at least 70 kg/cm$^2$ to 110 kg/cm$^2$. The term "mold temperature" means the temprature at the inside surface of the mold which forms the finished surface as measured by a pyrometer or the like. The molding temperatures range from at least about 138° C. to 177° C. and above.

The encapsulated initiators are powdery materials and are used in the same manner as non-encapsulated initiators. From about one to two percent by weight of the organic peroxide initiator is used based upon the weight of the resin in monomer in accordance with the current practice. Smaller adjustments must be made, however, for the weight of the encapsulating material.

It will be understood that, in accordance with the patent laws, the foregoing examples are by way of illustration and not limitation, and that various modifications and adaptations of the inventions disclosed herein may be made without departing from the spirit thereof.

What is claimed is:

1. A process for the manufacture of a molded, reinforced polyester resin polymeric product comprising the steps of:
   (a) forming by intensively mixing a ready-to-mold resin and reinforcement composite of an unsaturated polyester resin reactant, a cross-linking monomer, reinforcing material, and microcapsules of from 5 to 200 microns in diameter containing a liquid phase including an initiator for cross-linking of the polyester resin reactant and the monomer, said microcapsules isolating said initiator from said resin until a predetermined elevated temperature of at least about 180° C. is reached in the process;
   (b) aging said composite until a control viscosity of at least 60,000,000 centipoises at 22° C. is reached;
   (c) introducing a predetermined amount of said composite into a cavity of a mold;
   (d) applying heat and pressure to said composite to fill said mold cavity uniformly with mixture prior to any significant initiator-induced cross-linking during a first portion of the molding cycle;
   (e) causing said microcapsules to release said initiator at said predetermined elevated temperature by using the vapor pressure of the liquid phase within the microcapsules, and thereby terminating said first portion of the molding cycle and commencing a second exothermic portion of the molding cycle, said microcapsules having a wall thickness and strength sufficient to withstand the vapor pressure of said liquid phase up to the internal pressure developed in the microcapsules at said predetermined elevated temperature;
   (f) effecting substantially all initiator-induced cross-linking during said second exothermic portion of the molding cycle whereby said first portion of said molding cycle is substantially prolonged by maintaining said initiator in said microcapsules and the prolongation of the first portion of said molding cycle permits the use of increased molding temperatures and a net reduction in the overall molding cycle as compared with the use of such initiator in the composite in a conventional nonencapsulated form; and
   (g) removing the cured composite from said mold cavity to provide said polymeric product.

2. The process of claim 1, wherein said microcapsule has a wall thickness and strength sufficient to withstand pressures within said cavity up to at least 70 kg/cm$^2$ at said predetermined temperature.

3. The process of claim 1, wherein said ready-to-mold resin and reinforcement composite is a compound selected from the group consisting of SMC and BMC.

4. The process of claim 1, wherein at least one additive is added to said composite in step (a).

5. The process of claim 1, in which the molding temperature is increased and a net reduction in the overall molding cycle is obtained.

6. The process of claim 1, wherein the predetermined elevated temperature is between 128° and 167° C.

7. The process of claim 1, wherein said microcapsules release the initiator at a temperature in the range of from about 30° C. below the molding temperature to about the molding temperature.

8. The process of claim 1, wherein the temperature reached by the composite in step (a) is between 32° and 65° C.

9. The process of claim 1, in which the liquid phase comprises the initiator.

10. The process of claim 1, in which the liquid phase comprises a solvent for the initiator.

11. The process of claim 1, in which the liquid phase comprises a liquid included within the microcapsules to provide the liquid phase.

* * * * *

UNITED STATES PATENT AND TRADEMARK OFFICE
CERTIFICATE OF CORRECTION

PATENT NO. : 4,524,043
DATED : June 18, 1985
INVENTOR(S) : John R. McDougal

It is certified that error appears in the above-identified patent and that said Letters Patent are hereby corrected as shown below:

Column 4, line 52, change "of" to --or--;

Column 7, line 29, change "may" to --my--;

Column 9, line 65, after "ready-to-mold" insert --SMC or TMC--;and

Column 10, delete claim 3.

On the title page "11 Claims" should read --10 Claims--.

Signed and Sealed this

Eleventh Day of March 1986

[SEAL]

Attest:

DONALD J. QUIGG

Attesting Officer

Commissioner of Patents and Trademarks